United States Patent [19]

McClanahan et al.

[11] Patent Number: 4,510,482

[45] Date of Patent: Apr. 9, 1985

[54] PROTECTIVE CIRCUIT FOR ELECTRONIC TEST PROBES

[75] Inventors: John B. McClanahan, Hillsboro; Marvin E. LaVoie, Aloha; Wayne E. Kelsoe, Beaverton; James Wrobel, Banks, all of Oreg.

[73] Assignee: Tektronix, Inc., Beaverton, Oreg.

[21] Appl. No.: 449,900

[22] Filed: Dec. 15, 1982

[51] Int. Cl.³ .......................... G01K 7/16; H02H 5/04
[52] U.S. Cl. ..................................... 338/24; 338/23; 361/103; 361/106
[58] Field of Search ............... 338/22 R, 24, 308, 215, 338/17, 314, 306, 23; 361/24, 103, 106

[56] References Cited

U.S. PATENT DOCUMENTS

| 2,438,495 | 3/1948 | Chatterjea | 361/106 |
|---|---|---|---|
| 3,017,564 | 1/1962 | Barney | 361/106 X |
| 3,503,030 | 3/1970 | Matsumoto et al. | 338/24 X |
| 3,505,632 | 4/1970 | Matsuzaki et al. | 338/23 |
| 3,526,809 | 9/1970 | Obenhaus | 361/24 |
| 3,621,446 | 11/1971 | Smith et al. | 338/23 |
| 3,843,949 | 10/1974 | Plough et al. | 338/23 |
| 4,068,281 | 1/1978 | Harnden | 361/106 |
| 4,160,969 | 7/1979 | Holmes | 338/23 |
| 4,450,496 | 5/1984 | Doljack et al. | 361/106 X |
| 4,467,386 | 8/1984 | Wasson | 361/103 X |

FOREIGN PATENT DOCUMENTS 2117639 10/1972 Fed. Rep. of Germany ...... 361/106

OTHER PUBLICATIONS

Van Steensel et al., "Thin Film Switching Elements of $VO_2$", Phillips Research Reports, vol. 22, 1967, pp. 170–177.

Bruck et al., "Why the Design Nod Goes to Resistors Made as Thin-Film Monolithic Networks", Electronics, Aug. 3, 1978, pp. 99–104.

Primary Examiner—Roy N. Envall, Jr.
Assistant Examiner—C. Sears
Attorney, Agent, or Firm—John Smith-Hill

[57] ABSTRACT

A resistor device comprises a first film of resistive material deposited on a dielectric substrate and having two terminal portions for connection to an electrical circuit, and a second film of resistive material deposited on the substrate in thermally-conductive contact with the first film and electrically isolated therefrom. The material of one of the films has a relatively high temperature coefficient of resistance, so that the resistance of that film can be utilized as an indication of the temperature of the other film.

4 Claims, 4 Drawing Figures

PROTECTIVE CIRCUIT FOR ELECTRONIC TEST PROBES

This invention relates to a device for detecting power delivered to a resistive load.

BACKGROUND OF THE INVENTION

It is known to provide a test instrument, such as an oscilloscope, having an input terminal connected to an attenuator, with selectable high impedance and low impedance input terminations for use when testing high and low voltage sources respectively. The attenuator may be a hybrid circuit formed on a ceramic substrate, in which case the terminations may be provided by respective load resistors which are screened on the ceramic substrate by conventional thick film techniques. Typically, the low impedance termination is provided by a 50 ohm resistor designed to dissipate about 1 watt, in which case the maximum RMS voltage rating for the 50 ohm input mode may be 5 volts, equivalent to a power dissipation of 0.5 watt.

The high impedance input termination may be a 1 megohm resistor. If the instrument is being used in the 1 megohm input mode for measuring a high voltage, and is switched to the 50 ohm input mode preparatory to measuring a much lower voltage without first disconnecting the high voltage, excessive power may be applied to the 50 ohm resistor, causing the resistor to burn out. This problem has previously been avoided by using an integrated circuit to sense the voltage drop across the 50 ohm resistor. Since the power dissipated in the resistor is proportional to the RMS value of the voltage drop across the resistor, the circuit must be capable of effecting an RMS conversion. An appropriate integrated circuit is quite complex and expensive, since it must be capable of operating over the entire bandwidth within which the instrument is designed to operate, and should be capable of carrying out an RMS conversion not only on simple sine waves but also on arbitrary waveforms. Moreover, the IC may itself degrade the shape of the waveform reaching the attenuator.

SUMMARY OF THE INVENTION

According to a first aspect of the present invention there is provided a resistor device comprising a substrate of electrically insulating material, a first film of resistive material deposited on said substrate and having two terminal portions for connection to an electrical circuit, and a second film of resistive material deposited on said substrate in thermally-conductive contact with said first film and electrically isolated therefrom, the material of one of said first and second films having a relatively high temperature coefficient of resistance, whereby the resistance of said one film can be utilized as an indication of the temperature of the other film.

According to a second aspect of the present invention there is provided an electrical device comprising an input terminal for receiving an input signal having a potential different from a ground potential level, a load resistor connectable between said input terminal and the ground potential level, a temperature sensitive member in good thermally-conductive contact with said load resistor, and switch means which are actuable to isolate the load resistor from the input terminal, whereby the temperature sensitive member can be connected to a protective circuit for actuating the switch means to disconnect the load resistor from the input terminal in the event that the temperature of the load resistor, as sensed by the temperature sensitive member, enters a predetermined range of values.

BRIEF DESCRIPTION OF THE DRAWING

For a better understanding of the invention and to show how the same may be carried into effect, reference will now be made, by way of example to the accompanying drawing in which.

In the different figures, like reference numerals denote like elements.

DETAILED DESCRIPTION OF THE INVENTION

Figure 1:
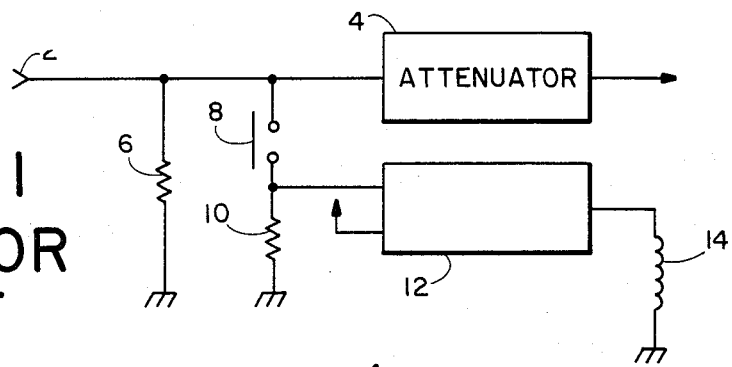
FIG. 1 illustrates, partly in block form and partly in schematic form, the input section of a conventional oscilloscope.

FIG. 1 illustrates diagrammatically the input section of a conventional oscilloscope. The input section comprises an input terminal 2 which is connected to attenuator 4. The attenuator 4 is constituted by a hybrid circuit formed on a ceramic substrate (not shown). A 1 megohm resistor 6 is connected between the input terminal 2 and a ground potential level, and a series combination of a switch 8 and a 50 ohm resistor 10 is connected in parallel with the resistor 6. The resistors 6 and 10 are formed on the ceramic substrate using thick film techniques. The switch 8 is manually operable. When the switch is open, the oscilloscope has a 4 megohm input termination, and when the switch is closed, the parallel combination of the resistor 6 and 10 provides an input termination of substantially 50 ohm.

In order to protect the resistor 10 from overload in the event that an excessive voltage is applied to the terminal 2, the connection point of the switch 8 and the resistor 10 is connected to a voltage sensing circuit 12. The circuit 12 derives the RMS value of the voltage at the connection point of the switch 8 and the resistor 10 and compares it with a predetermined value, for example 7 volts, and if the voltage at the connection point exceeds the predetermined value the circuit 12 provides an output current to energize a relay coil 14, which operates to open the switch 8.

In the case of a wide bandwidth (e.g. 250 Mhz) oscilloscope, the voltage sensing circuit 12 must be designed to handle signals of frequency up to 250 MHz, and accordingly it is complex and expensive. The circuit 12 is much more expensive than the resistor which it protects, but it will be appreciated that the resistor 10 cannot simply be permitted to burn out because the oscilloscope could not then be used to observe small voltage signals until the resistor was replaced. In addition, since the resistor 10 and the attenuator are constructed on a common ceramic substrate, replacement of the resistor involves replacement of the attenuator also.

Figure 2:
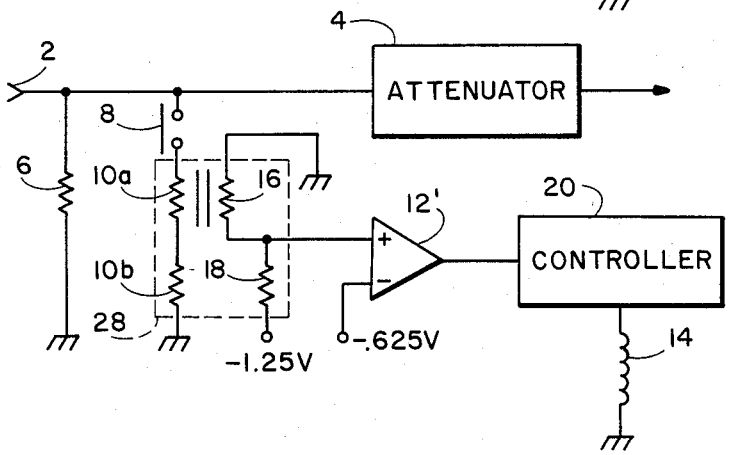
FIG. 2 illustrates, similarly to FIG. 1, an input section embodying the present invention.

In the case of FIG. 2, the resistor 10 is divided into two sections 10a and 10b, and a thermally sensitive resistor 16 having a large negative temperature coefficient of resistance is provided in close thermally-conductive contact with the resistor section 10a, and the comparator 12' detects when the resistance of the resistor 16 falls to a predetermined minimum permitted value. As shown in FIG. 2, the resistance of the resistor 16 is detected by connecting the resistor 16 in series with a second resistor 18 between two reference potentials, and using the comparator 12' to compare the voltage drop across the resistor 16 with a third reference potential. As shown, in the preferred implementation of the FIG. 2 construction, the first and second potential levels are ground and −1.25 volts, and the third reference potential is a −0.625 volts. Accordingly, the comparator 12' provides a response when the resistance of the resistor 16 is equal to that of the resistor 18. The resistance of the resistor 16 depends on its temperature, which in turn depends on the power dissipated by the resistor 10 and consequently on the RMS value of the voltage at the terminal 2. If the RMS value of the voltage at the terminal 2 becomes excessive and the resistance of the resistor 16 accordingly falls below its minimum permitted value, the comparator 12' generates a protection response.

The resistor 10 is designed to be used in an environment in which the ambient temperature is in the range from 0° to 70° C. When there is a 5.5 volt potential drop across the resistor, the power dissipated in the resistor results in a temperature increase of approximately 20° C. Accordingly, the maximum temperature of the resistors 10a and 16 under normal operating conditions is 90° C. The output of the comparator 12' is polled at 35 ms intervals by a controller 20, and in the event that the comparator's output indicates that the resistance of the resistor 16 has fallen below that of the resistor 18 the controller provides an energizing current to the coil 14, which activates the switch 8 to its open position. The maximum voltage which will be applied to the resistor 10 during normal operation is 50 volts, since at higher voltages the switch 8 will burn out. Therefore, the resistor 10 is designed to heat up sufficiently slowly under a potential difference of 50 volts, that the maximum delay of 35 ms between attaining the temperature at which its resistance is equal to that of the resistor 18, so that a protection response is required, and the time at which the output of the comparator is polled, is insignificant.

The protection circuit is designed to cause the comparator 12' to provide a protection response when the temperature of the resistor 16 reaches 120° C., i.e., the temperature of the resistor 16 has increased by only 30° C. above its normal maximum value of 90° C.

The resistors 10a, 10b, 16 and 18 are formed on a common ceramic substrate using conventional thick film printing techniques. Initially, conductive terminations for the resistors 10a, 10b and 18 are screened onto the substrate, and the terminations are fired. The resistor 10a is then screened and fired, and a first layer of dielectric material is screened over the resistor 10a and is fired. A second layer of dielectric material is screened over the first layer and is fired, and conductive terminations for the resistor 16 are screened and fired. The resistor 16 is screened over the dielectric material and the resistors 10b and 18 are screened onto the substrate, and the resistors 10b, 16 and 18 are fired. The assembly is then immersed in a bath at 120° C. and the resistance of the resistor 16 is measured. The resistor 18 is trimmed to make its value equal to that of the resistor 16 at 120° C. Finally, the resistor 10b is trimmed to make the total value of the resistors 10a and 10b equal to 50 ohms.

The resistor 10 is divided into two sections because of the need to ensure good thermally-conductive contact between the resistor 16 and at least a part of the resistor 10 and to minimize the influence of the temperature of the substrate on the temperature of the resistor 16 and thereby ensure a rapid response to a change in temperature of the resistor 10. These factors then necessitate that the resistor 16 be screened on top of the sensed part of the resistor 10. Since the sensed part of the resistor 10 undergoes five firings, its final resistance cannot be accurately predicted, and therefore the resistor 10 must be trimmed. The sensed part of the resistor 10, i.e., the section 10a, cannot be trimmed because it is covered by the layers of dielectric material and the resistor 16.

Preferably, the resistors 10a and 10b are made of a ruthenium oxide based composition having a resistivity of 10 ohm per square, such as is sold under the trade name DuPont 1400 Series Thick Film resistor System. The resistor 16 is made of a material available from Thick Film Systems, Division of Ferro Corporation, having a temperature coefficient of resistance of $-4,500 \times 10^{-6}$° C.$^{-1}$ and a resistivity of 8.5 kilo-ohm per square. The dielectric material is selected to be compatible with the resistors 10a and 16 and with the processing conditions, and may, for example, be made of the material known as Multilayer Dielectric 9121 and sold by Electro Materials Corp. of America.

Figure 3:
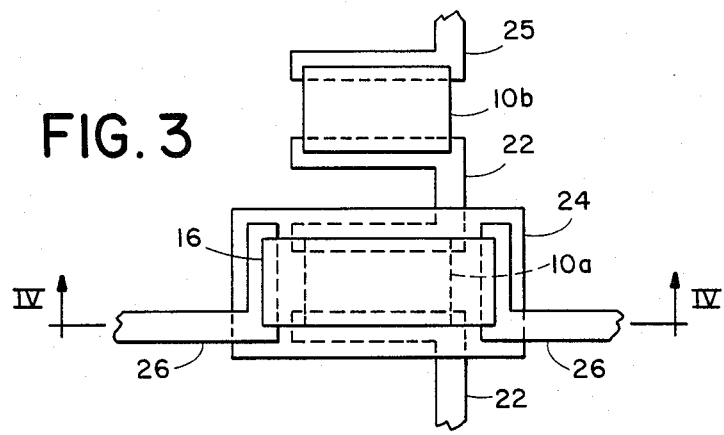
FIG. 3 is a top plan view, drawn to an enlarged scale, of part of FIG. 2.
Figure 4:
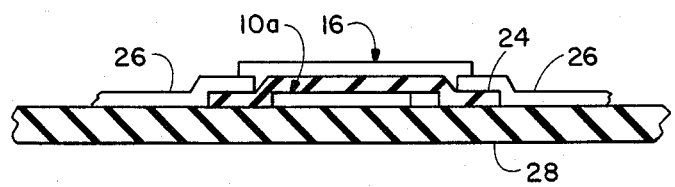
FIG. 4 is a sectional view taken on the line IV—IV of FIG. 3.

The preferred arrangement of the resistors 10a and 10b and the resistor 16 is shown in FIGS. 3 and 4. FIGS. 3 and 4 show the resistor 10a on top of a substrate 28 and provided with terminations 22. The resistor 10b is deposited on top of one of the terminations 22 and its own terminator 25. The dielectric material is shown as a single layer 24 deposited on top of the resistor 10a, and the resistor 16, having terminations 26, is deposited on top of the layer 24.

It will be appreciated that the invention is not restricted to the particular circuits and devices which have been described and illustrated, since variations may be made therein without departing from the scope of the invention as defined in the appended claims, and equivalents thereof. For example, the invention is not applicable only to a switchable high resistance/low resistance input termination, but could also be applied to an input section having only one relatively low resistance, e.g. 50 ohm, input termination. In this case, the relay could actuate a switch in the input line so as to protect not only the resistor itself but also other components of the instrument downstream of the switch from excessive input voltages. It is not essential that an attenuator be associated with the protected resistor, since the invention may be applied to protect, for example, a 75 ohm television receiver-type input. On the other hand, the invention is not applicable only to protection of an input resistor, since it could also serve to protect, e.g., the power dominant resistance element of an attenuating network. Using different circuit designs, a thermally sensitive resistor having a greater or smaller temperature coefficient of resistance may be used, or a thermistor may be used in place of the thermally sensitive resistor. (To those skilled in the art, a coefficient of $-4,500 \times 10^{-6}$ per °C. is too small for the resistor to be considered a thermistor.)

We claim:
1. An electrical device comprising:
a dielectric substrate;
an input terminal formed upon said dielectric substrate for receiving an input signal having a potential different from a ground potential level,
a load resistor formed upon said dielectric substrate and connectable between said input terminal and the ground potential level, said load resistor includ- ing at least two load resistor portions connected together and having a combined resistance equal to a desired value, wherein said load resistor is constituted by a first film of resistive material formed on a main face of the dielectric substrate in first and second discrete portions, corresponding to said first and second load resistor portions respectively, a temperature sensitive member in good thermally conductive contact with one, but not all, of said load resistor portions, said temperature sensitive member being constituted by a second film of resistive material formed on a main face of the substrate, switch means which are actuable to isolate the load resistor from the input terminal, and a protective circuit connected to and operable by said temperature sensitive member for actuating said switch means.

2. A device according to claim 1, further comprising a resistor connected in series with said second film to form a voltage divider therewith.

3. In combination, an electrical device according to claim 1, and a protective circuit, said protective circuit comprising means for sensing the resistance of said resistive member.

4. A combination according to claim 3, wherein said protective circuit comprises a resistor connected in series with said resistive member between first and second reference potential levels, and said protective circuit comprises a comparator for comparing the potential at the connection point of said resistor and said resistive member with a third reference potential level.

* * * * *

UNITED STATES PATENT AND TRADEMARK OFFICE
CERTIFICATE OF CORRECTION

PATENT NO. : 4,510,482

DATED : April 9, 1985

INVENTOR(S) : John B. McClanahan et al.

It is certified that error appears in the above—identified patent and that said Letters Patent is hereby corrected as shown below:

Column 2, line 35, reads "4 megohm" should be --1 megohm--.

*Signed and Sealed this*

*Twentieth* Day of *August 1985*

[SEAL]

*Attest:*

DONALD J. QUIGG

*Attesting Officer*    *Acting Commissioner of Patents and Trademarks*